United States Patent
Filev et al.

(10) Patent No.: US 9,020,743 B2
(45) Date of Patent: Apr. 28, 2015

(54) METHODS AND APPARATUS FOR PREDICTING A DRIVER DESTINATION

(75) Inventors: Dimitar Petrov Filev, Novi, MI (US); Ryan Abraham McGee, Ann Arbor, MI (US); Johannes Geir Kristinsson, Ann Arbor, MI (US); Payam Naghshtabrizi, Farmington Hills, MI (US); Fling Tseng, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 186 days.

(21) Appl. No.: 13/400,304

(22) Filed: Feb. 20, 2012

(65) Prior Publication Data
US 2013/0218379 A1    Aug. 22, 2013

(51) Int. Cl.
*G06F 19/00* (2011.01)
*G01F 9/02* (2006.01)
*G01C 21/36* (2006.01)
*G01C 21/34* (2006.01)

(52) U.S. Cl.
CPC ............ *G01F 9/023* (2013.01); *G01C 21/3617* (2013.01); *G01C 21/3484* (2013.01)

(58) Field of Classification Search
USPC ................. 701/22, 123; 180/65.1–65.29, 6.5; 700/291
See application file for complete search history.

(56) References Cited

U.S. PATENT DOCUMENTS

| | | | |
|---|---|---|---|
| 6,484,088 B1 | 11/2002 | Reimer | |
| 6,988,033 B1 | 1/2006 | Lowrey et al. | |
| 7,398,147 B2 | 7/2008 | Kozarekar et al. | |
| 7,925,426 B2 | 4/2011 | Koebler et al. | |
| 8,050,856 B2 | 11/2011 | Duty et al. | |
| 8,116,915 B2 * | 2/2012 | Kempton | ...................... 700/291 |
| 2004/0034460 A1 | 2/2004 | Folkerts et al. | |
| 2004/0093264 A1 | 5/2004 | Shimizu | |
| 2004/0094912 A1 | 5/2004 | Niwa et al. | |
| 2005/0021205 A1 | 1/2005 | Niwa et al. | |
| 2005/0228553 A1 | 10/2005 | Tryon | |
| 2006/0287798 A1 | 12/2006 | Inoue et al. | |
| 2007/0027593 A1 | 2/2007 | Shah et al. | |
| 2008/0059035 A1 | 3/2008 | Siddiqui et al. | |

(Continued)

OTHER PUBLICATIONS

Ford Motor Company, "SYNC with Navigation System," Owner's Guide Supplement, SYNC System Version 1 (Jul. 2007).

(Continued)

*Primary Examiner* — Thomas Tarcza
*Assistant Examiner* — Tyler J Lee
(74) *Attorney, Agent, or Firm* — David B. Kelley; Brooks Kushman, P.C.

(57) ABSTRACT

A computer implemented trip-planning method includes accessing one or more destination elements of a matrix of driver information, the accessing based at least in part on a trip start time and day of week. Each accessed element has a probability associated therewith, indicating the likelihood of the element being the destination at which a vehicle trip will end, based at least the start time and day of week. The method also includes selecting, from the one or more elements, a destination having the highest probability of being the destination at which the vehicle trip will end. Further, the method includes utilizing the selected destination as an end destination for the purposes of trip planning.

18 Claims, 3 Drawing Sheets

(56) References Cited

U.S. PATENT DOCUMENTS

| | | |
|---|---|---|
| 2008/0295586 A1 | 12/2008 | Fosseen |
| 2009/0082917 A1 | 3/2009 | Adachi |
| 2009/0099724 A1 | 4/2009 | Kranz et al. |
| 2010/0262321 A1 | 10/2010 | Daum et al. |
| 2010/0324752 A1 | 12/2010 | Suganuma et al. |
| 2011/0022197 A1 | 1/2011 | Kultgen, II |
| 2011/0046834 A1 | 2/2011 | Grider et al. |
| 2011/0054768 A1 | 3/2011 | Sullivan |
| 2011/0106375 A1 | 5/2011 | Gurusamy Sundaram |
| 2011/0130905 A1 | 6/2011 | Mayer |
| 2011/0166739 A1 | 7/2011 | Oesterling |
| 2011/0166773 A1 | 7/2011 | Raz et al. |
| 2011/0234427 A1 | 9/2011 | Ingram et al. |
| 2011/0313647 A1 | 12/2011 | Koebler et al. |

OTHER PUBLICATIONS

Ford Motor Company, "SYNC," Owners's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem," Automotive Design & Production, Oct. 2003, http://findarticles.com, pp. 103.

* cited by examiner

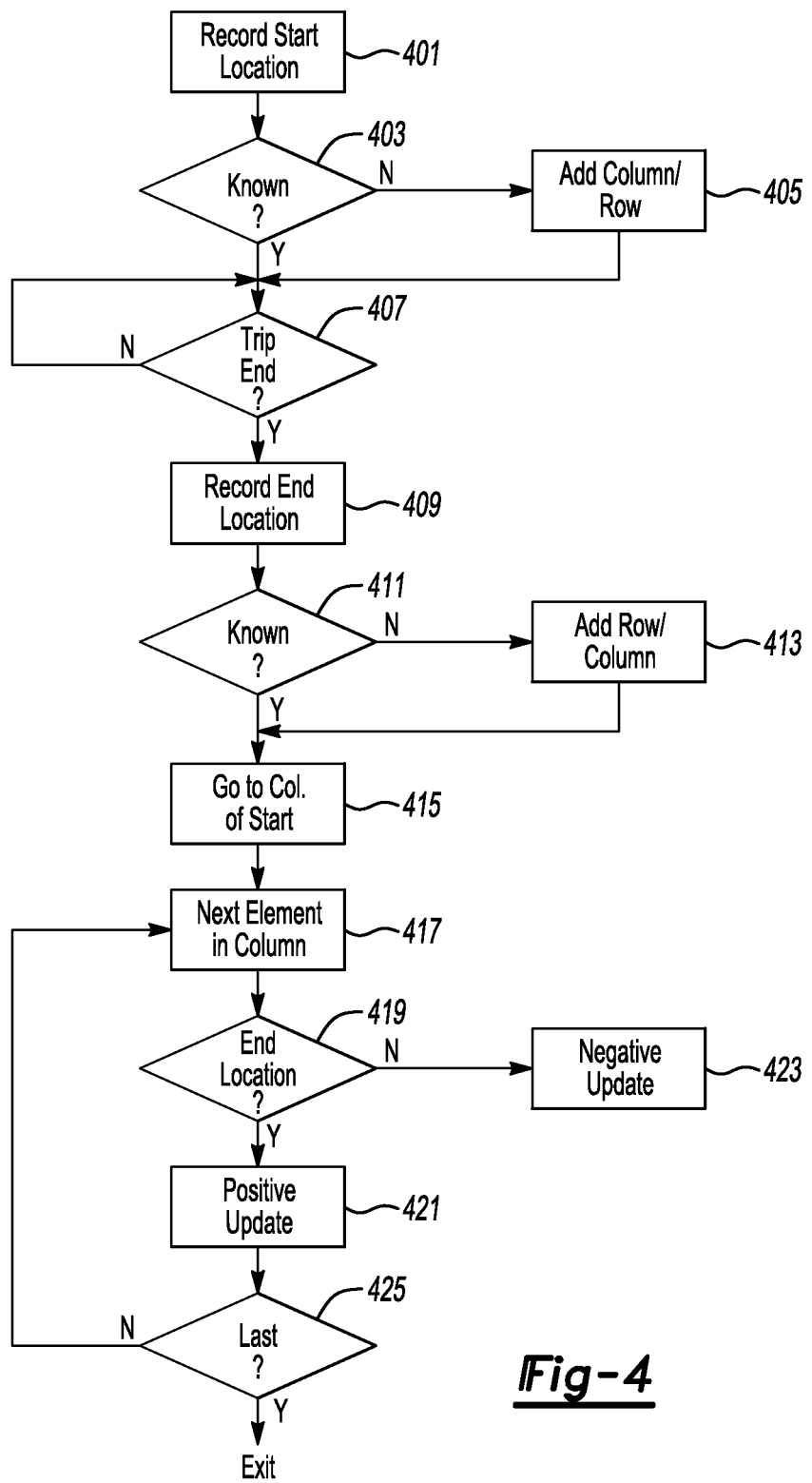

METHODS AND APPARATUS FOR PREDICTING A DRIVER DESTINATION

TECHNICAL FIELD

The illustrative embodiments generally relate to methods and apparatus for predicting a driver destination.

BACKGROUND

Advances in vehicle integrated computer technology have made it possible to not only control a variety of vehicle systems through integrated software and hardware, but to actually optimize those systems based on observed conditions.

For example, certain existing protocols provide methods and techniques for optimizing fuel efficiency based on observed conditions of travel between a current location and a destination. Traffic, weather, even road surface conditions may be considered when optimizing the powertrain controls. Of course, to provide optimization with such foresight, it is desirable to know where the driver is going.

Even though many vehicles are equipped with navigation systems, drivers, especially when driving to a familiar location, will not always input their destination. Accordingly, it is not always apparent where a vehicle is headed. Further, it may be cumbersome or even annoying to a driver to require them to input a destination every time that a trip is undertaken. While a driver may realize monetary gains in fuel economy (and other optimization strategies), the driver may still find it bothersome to have to spend the time to input a destination on every trip.

Further, many vehicle navigation systems are equipped with a lockout function that prevents entry of a destination once the vehicle is underway. Which means, if a driver wishes to enter a destination to take advantage of optimization algorithms, the driver may actually have to pull off the road and stop the trip. Such detours may be undesirable for a driver and it would be preferable if they were totally or at least largely unnecessary.

In one example, for plug-in hybrid electric vehicles (PHEVs), it is a common practice for the vehicle to operate in charge depletion mode for a fixed distance or when the target depth of discharge is met. After that, the system switches to charge sustaining mode where battery SOC is maintained around a fixed level. There may be potential energy economy benefits (avg. range/charge) if a PHEV's charge depletion profile is modified to extended the depletion distance matching the driver's intended driving distance until the next location where charging activity can take place.

Unfortunately, unless a destination is known or predicted, it could be very difficult to know when a next charging activity can take place, and, accordingly, it could be very difficult to manage energy depletion until this event.

SUMMARY

In a first illustrative embodiment, a computer implemented trip-planning method includes accessing one or more destination elements of a matrix of driver information, the accessing based at least in part on a trip start time and day of week. Each accessed element has a probability associated therewith, indicating the likelihood of the element being the destination at which a vehicle trip will end, based at least the start time and day of week.

The method also includes selecting, from the one or more elements, a destination having the highest probability of being the destination at which the vehicle trip will end. Further, the method includes utilizing the selected destination as an end destination for the purposes of trip planning.

In a second illustrative embodiment, a computer implemented vehicle operating method includes accessing one or more destination elements of a matrix of driver information, the accessing based at least in part on a trip start time and day of week. Each accessed element has a probability associated therewith, indicating the likelihood of the element being the destination at which a vehicle trip will end, based at least the start time and day of week.

The method further includes selecting, from the one or more elements, a destination having the highest probability of being the destination at which the vehicle trip will end. Also, the method includes utilizing the selected destination as an end destination for the purposes of vehicle operation, including at least fuel optimization determinations to optimize fuel usage to the end destination.

In a third illustrative embodiment, a vehicle based computing system includes a processor, in communication with at least a memory, at least one vehicle network, with which the processor is operable to communicate, and a transceiver, providing communication between the processor, a mobile, wireless device, and a remote network accessed through the mobile, wireless device.

The processor is operable to execute instructions stored in the memory to perform a method including accessing one or more destination elements of a matrix of driver information, the accessing based at least in part on a trip start time and day of week. Each accessed element has a probability associated therewith, indicating the likelihood of the element being the destination at which a vehicle trip will end, based at least the start time and day of week. The illustrative method performed by the processor also includes selecting, from the one or more elements, a destination having the highest probability of being the destination at which the vehicle trip will end. Further, the method includes utilizing the selected destination as an end destination for the purposes of trip planning.

In a fourth illustrative embodiment, a hybrid vehicle control system includes a processor, in communication with at least a memory; at least one vehicle network, with which the processor is operable to communicate; a transceiver, providing communication between the processor, a mobile, wireless device, and a remote network accessed through the mobile, wireless device.

The processor is operable to execute instructions stored in the memory to perform a method including accessing one or more destination elements of a matrix of driver information, the accessing based at least in part on a trip start time and day of week. Each accessed element has a probability associated therewith, indicating the likelihood of the element being the destination at which a vehicle trip will end, based at least the start time and day of week. The method also includes selecting, from the one or more elements, a destination having the highest probability of being the destination at which the vehicle trip will end, and utilizing the selected destination as an end destination for the purposes of hybrid vehicle operation. The utilization includes delivering the end destination to an energy optimization module operable to perform at least energy optimization determinations to optimize battery usage to the end destination.

BRIEF DESCRIPTION OF THE DRAWINGS

FIG. 4 shows an illustrative example of a second data evaluation process;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
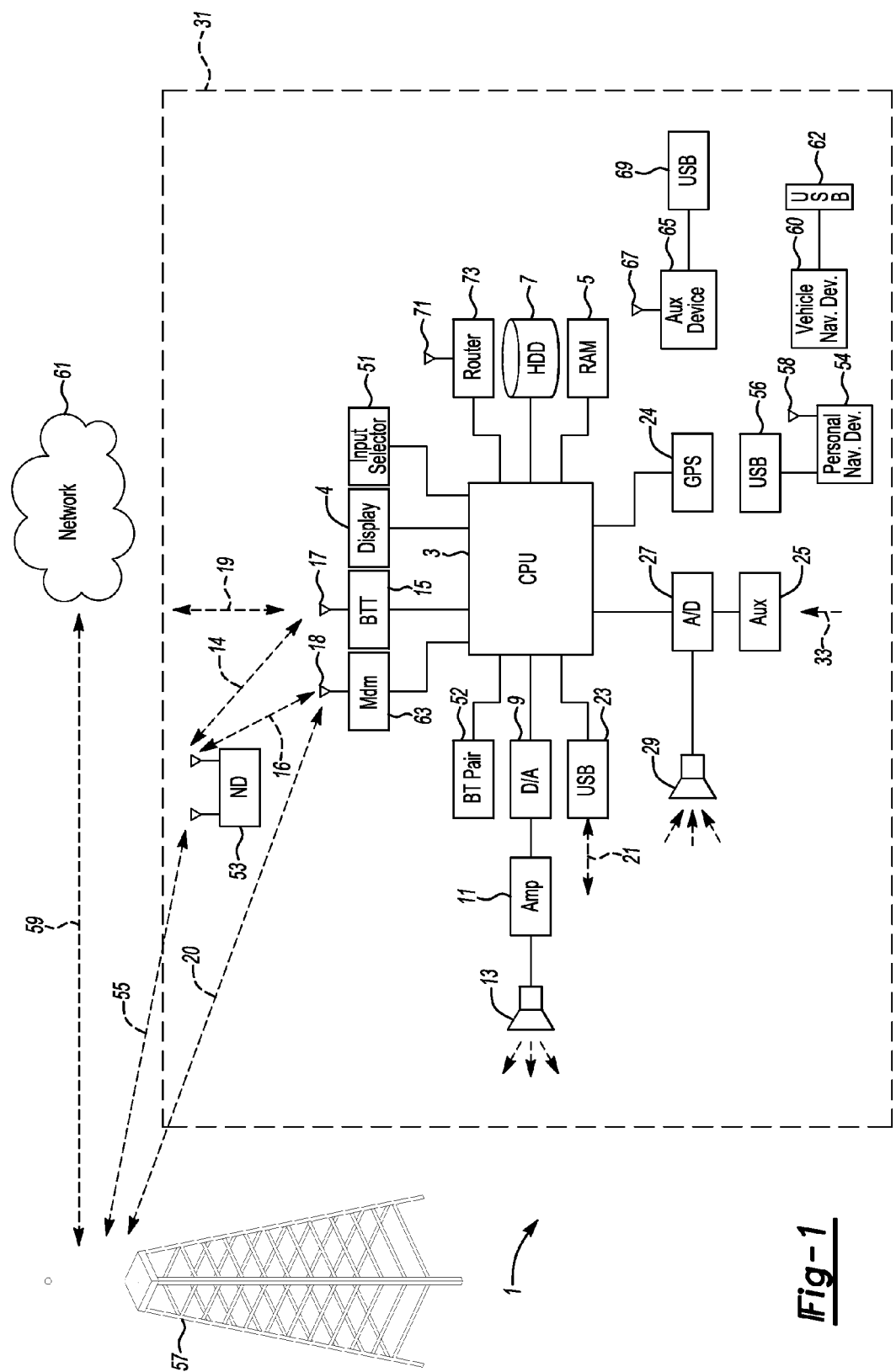
FIG. 1 shows an illustrative example of a vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

The illustrative embodiments use inputs such as, but not limited to, location information (GPS), vehicle speed and time as context information to build a model of driver behavior. Discrete regions are defined in 2-D time space spanned by DOW (Day of week) and TOD (Time of Day) sets, which can be derived from time, and each DOW and TOD set is associated with a transition probability matrix among frequent stop locations. The system automatically identifies stop locations, trips made between locations and generalizes the relationships between locations for predictive purposes. It supports single or multiple-steps-ahead prediction with single or multiple destination predictions. Supportive trip information such as trip distance, trip duration and stop duration at the destination is also predicted as needed.

Assuming a 2-D weekly calendar-like representation of the time domain where the x-axis is DOW and y-axis is TOD, each DOW and TOD set defines a region in time associated with a K×K transition probability matrix.

K represents the number of unique locations the system has identified so far. In the transition probability matrix, the x-axis represents the starting location and y-axis represents the ending location. Learning of the driving pattern is straightforward by applying positive exponential updates to time regions when the vehicle is being driven and apply negative exponential updates to time regions when the vehicle is not being used.

Positive and negative updates are realized by switching $f_{01}$ between 1 and zero in eq. (1) below. $F(t-1)$ denotes the frequency value prior to the update and $F(t)$ denotes the value after the update. Over time, the driver's frequency (probabilistic value) of utilizing the vehicle can be captured and similarity measures among different time regions can be calculated from it.

$$F(t)=F(t-1)+\text{alpha}_s(f_{01}-F(t-1)) \quad (1)$$

Figure 2:
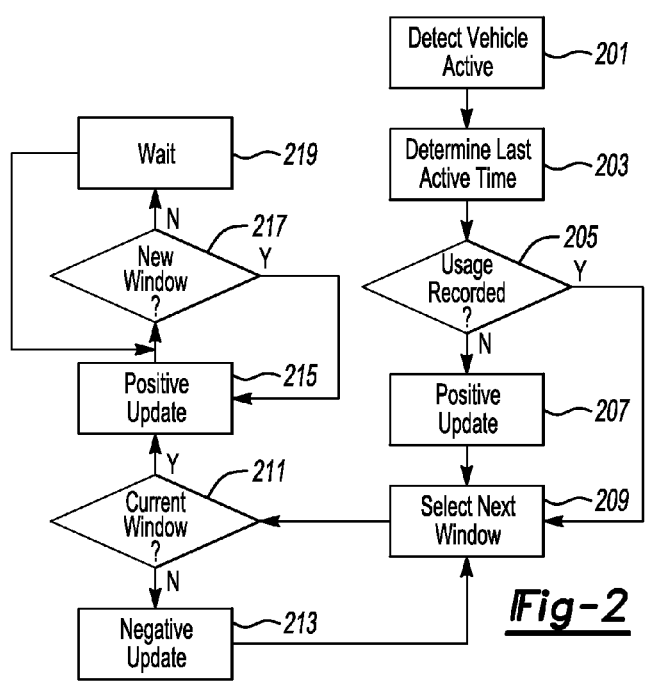
FIG. 2 shows an illustrative example of a data evaluation process.

FIG. 2 shows one illustrative example of a data evaluation process as described above. This is merely an exemplary way of gathering and evaluating the data, and is meant as a non-limiting example. Other suitable methods of data evaluation may also be employed.

In this illustrative example, the gathering/evaluating may be done by a vehicle computing system, a remote system, the two systems in conjunction, and/or one or more modules operating on either or both systems. Other suitable sources of processing may also be used. In this example, the process detects that the vehicle is active 201 (or that a data evaluation process has begun). In this example, the vehicle will save data when it is rendered inactive (such as a key-off event). This data will at least include a time when the key-off event occurred.

The evaluation process determines when the vehicle was last active by accessing data relating to the last key-off event 203. Key off events may also only be recorded if the vehicle actually changed locations or was put into drive.

For the determined last-active time, the process then determines if a usage statistic was recorded for a time block most closely corresponding to that time 205. For example, if time was measured in 3 hour blocks, starting with 0:00, and the vehicle was last active at 2:53 P.M., the process would determine if data had been recorded for the 12:00-15:00 time block. Presumably, upon the last operation prior to 2:53, time blocks between an earlier operation and the last operation had been addressed.

If there was no data recorded for the 12:00-15:00 time block 205, the process would positively update (for example, without limitation, using equation (1)) a time block 207 corresponding to 12:00-15:00. This update provides an indication that the vehicle was used during that time period (and/or on the particular day). This recordation is accurate since the vehicle was last used at 2:53 (14:53) and thus was used during the appropriate time block. By accruing data such as this, patterns of usage during particular time blocks on given days may begin to emerge for a specific driver. This data can be used to predictively determine when a "next usage" event will occur.

For example, if the driver often takes a lunch break from 2:00-3:00 on Monday-Friday, vehicle usage statistics over time will indicate that the vehicle is frequently powered in the 12:00-15:00 time block. Of course, more precise data can be obtained by reducing the size of the time blocks.

Next, in this illustrative process, a time window (e.g., a matrix element) following the 12:00-15:00 window is observed 209. It is determined, with respect to this window, whether or not the window corresponds to a "current" time window 211. For example, if it was currently 9:12 P.M. (21:12) and the next window was the 15:00-18:00 window, then the next window would not correspond to a current time window.

In the case where the next window does not correspond to the current time window, it is known that the vehicle was not active during that time window. This is because 2:53 (14:53) was observed as the last active time, meaning no activity occurred between 14:53 and 21:12 (the current time). Accordingly, the block corresponding to 15:00-18:00 is negatively updated, diminishing the observed activity value during that time block. The block could also simply be ignored, but in this example by positively augmenting periods where activity does occur and negatively augmenting periods of no activity, patterns may emerge more quickly.

Again, a next window (18:00-21:00) is selected 209 and again the next window does not correspond to a current window 211. Accordingly, another negative update is applied 213. When the next window (21:00-24:00) is selected, it is determined that this window corresponds to a current window 211. In other words, the present time 21:12 is within the time defined by the selected window.

Since the vehicle is currently under operation, in this example, the current window is updated in a positive manner 215 to indicate usage during this time block. Since the update may be periodic, as opposed to perpetual, the system may check to see if a new window has yet occurred (e.g., if the time has passed from 24:00 to 00:01) 217. If a new window is not yet observed, the process may wait, for example, either checking back periodically or being instructed to wait until such time as a new window is known to occur (e.g., 00:01). In this manner, data may be collected during periods of operation while at the same time filling in the data for periods where the vehicle was not operated.

CESM or correlation encoded similarity measure may serve to provide a single aggregated transition probability. This can be obtained through weighted summation of transition probability matrices associated with all time regions.

The calculation of the weights involves the use of driver usage patterns and its CEMS values. The procedure is summarized as the following:
1. Assuming di, i=1~7, represents 8-element column vectors of driving usage pattern from Sunday, Monday~Saturday. Applying eq. (2), a full 7×7 DOW CESM matrix between 7 days of the week is obtained. It is noted that the diagonal elements are ones (1s) and it is symmetric on the diagonal. A numeric example of DOW CESM is shown below where C1~C7 represents the similarity measures between each day to all seven days of the week.

$$CESM(i1, i2) = \frac{d_{i1} * d_{i2}^T}{\|d_{i1}\| * \|d_{i2}\|}, i1, i2 = 1, 2, \ldots, 7. \quad (2)$$

2. Similarly, a CESM with respect to the TOD space can be estimated by assuming dj to be usage pattern organized by TOD where j indicates a region in its space. A full TOD CESM matrix, D, is also a square matrix with diagonal elements to be ones and symmetric to the diagonal.
3. Given the start time of the trip, corresponding DOW and TOD can be obtained. Assume I'th DOW region and I'th TOD region correspond to the start time of the trip. $C_I$ and $D_J$ are subsets of a full DOW CESM matrix and a full TOD CESM matrix representing the similarity measure of a given DOW and TOD with respect to all DOW and TOD regions defined.
4. The weight matrix defining various firing levels of all transition probability matrices can be written as the following:

$$W = C_I^T \times D_J \quad (3)$$

In addition to learning periods of operation, K×K matrices relating to particular journeys may also be formed for evaluation. K represents the number of unique destinations to which a vehicle has been observed to travel. K may also be defined by a radius, such that destinations in close proximity are observed as a single destination.

Figure 3:
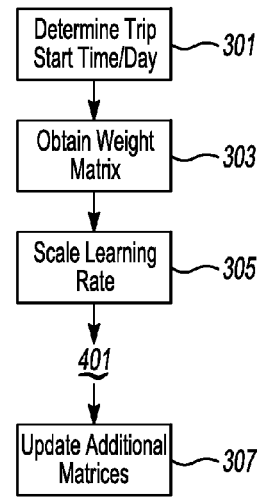
FIG. 3 shows an illustrative example of a data gathering process.

Each trip from start to finish may be referred to as a trip vector. When a newly completed trip vector is formed, following procedure may take place to gradually learn relationships between locations taking into account the context information DOW and TOD. Assuming the trip started in location N and stopped in location M (FIG. 3 shows an illustrative example of this process):
1. Given starting time of the trip 301, a weight matrix calculated based on DOW CESM and TOD CESM may be obtained from equations (2) and (3) 303.
2. Each element in W (the weight matrix), denoted as $W_s$, is the similarity measure between a DOW and TOD region, denoted as s, and the starting time of the trip. This value is used to scale the learning rate such that a closer match is the stronger a weighted update the corresponding transition probability matrix receives. Nominal learning rate, $alpha_n$, is set 305 to be 0.001 (or other suitable number).

$$alpha_s = alpha_n * W_s \quad (4)$$

It may be useful, especially when a vehicle or driver (depending on with what/whom the data is correlated) is relatively new (and thus there are few data points) to determine correlations between particular time blocks of different days and times. Time blocks having a high correlation (based on usage, start-destination, or other variables) can be updated in conjunction with a time block specifically corresponding to the observed time/day. Since the "learning" rate of the time blocks may vary based on the degree of correlation, these similar time blocks may not be updated in as significant degree as the observed time block, but a reasonable assumption that similar trips may be made at highly correlated times provides sufficient reason to update these blocks as well, to a lesser degree. Thus, data can be more quickly populated in the case of a new driver/vehicle.
3. Assuming a trip vector represents the vehicle started from location N and stopped at location M. We update K×K transition probability matrix's N'th column with following equations.

$$F(t) = F(t-1) + alpha_s(f_{01} - F(t-1)) \quad (1)$$

$f_{01}$ takes a value of zero except for the M'th element where it takes a value of 1. This update of the N'th column of the transition probability matrix represents the recursive form of the frequency counts. The M'th element of the N'th column representing the scenario where vehicle moves from location N to location M and received a positive update. The rest of the elements in the N'th column undergo an exponentially forgetting discount in their frequency value to reflect the fact that only the start location of the trip matches the current information vector. All other columns except for the N'th column receive no update because they don't represent trips starting from location N.

This updating is similar to the positive/negative updating done with respect to observed usage at a given TOD and/or DOW. Since a particular trip starting at M and ending at N is positively updated with respect to destination N, and all other trips starting at M and ending at other known destinations are negatively updated, patterns of arrival at a particular destination given a particular starting point begin to emerge.

4. A number of predefined K×K matrices, representing trip specific attributes such as distance, trip duration and stop duration may also be updated 307 with formulation of the exponential smoothing eq. (1). These attributes are considered to be only trip specific and not context (DOW and TOD) related. The update procedure is straightforward with the use of as the learning rate alpha$_n$ without any further scaling. During update of each attribute matrix, $f_{01}$ takes value of the current observation and only the content of the M'th element of the N'th column is updated.

FIG. 4 shows an illustrative example of a second data evaluation process as described above, for gathering/updating trip data. In this illustrative example, the gathering/evaluating may be done by a vehicle computing system, a remote system, the two systems in conjunction, and/or one or more modules operating on either or both systems. Other suitable sources of processing may also be used.

In this non-limiting example, a starting location of the vehicle is recorded when the process begins 401. Since the starting location may or may not already correlate to a location stored within the K×K matrix, it is determined if this starting location has been previously observed 403.

Since a driver may elect to park in varying parking spaces, for example, if the location is a work location, some degree of tolerance may be built into the "known location" determination. As long as a location is within the tolerance of the previously noted location, it will be considered to be the same known location and not a new location. Of course, it is also possible to record every location as different if desired, although with a highly accurate GPS system parking even a few feet away may then produce different location designations. Thus, in this example, K could escalate quickly and a computer with significant processing power may soon be needed to perform the evaluations described herein.

If the location is not known 403, then a new column and row is added to the K×K matrix, corresponding to the location. It is noted that, unless the process was not performed for the trip that led the driver to the present location, then the present location is likely already known, since it was the destination of the previous trip. Thus, it may be rare that a starting location is added as a new location (but could occur, for example, if the vehicle was newly started or had been towed).

Since the vector recording process, in this example, is only concerned with a start and end location, the process may wait until a trip has ended 407. This can be signaled by a key-off, putting the vehicle in park, etc.

Once the trip has ended, a destination/end location is determined 409, and it is also determined whether or not the end location is a previously known location 411. As with the start location, if the destination was not previously observed, a row and column is added to the K×K matrix corresponding to the destination 413.

Now that the travel vector is known, the process proceeds to a column corresponding to the start location 415. For each possible destination that is known 417, it is determined if the known destination corresponds to the current destination 419.

A correspondence between the known destination (i.e. row element of the column) and the current destination results in a positive update 421 of the value stored with respect to that element. This results in an increased percentage of travel between the two points. For all other elements in the column 419, provided that the last element in the column has not been augmented 425, a negative update is applied 423.

Again, it is possible to simply ignore the other elements in the column, but negatively updating the elements corresponding to locations that were not the destination may speed the evaluation process for an overall likelihood of a particular start point resulting in a particular destination.

Trip information may be collected including, but not limited to, GPS locations for the vehicle, vehicle speed and corresponding time information. Subsequently, the system summarizes the information into evidence tables categorized by the two time related tags, more specifically Day of Week (DOW) and Time of Day (TOD).

From these evidence tables, the system may produce trip tree-like predictions covering various possible outcomes (with probability values) given a specific starting time and location. Over time, the system gradually becomes more knowledgeable about the driver's driving routines and makes more accurate predictions.

As previously explained, using GPS and vehicle related parameters, frequently visited locations are identified by evaluating average time spent at each location. Multiple tables, each of whom is associated with a DOW (Monday-Sunday) and a TOD (0-24 h) tag, are created to record driver's frequent trips as they occur (with a set of recursive formulas). When a trip is observed, say going from location A to B, we first identify the table which DOW and TOD tags best matches the starting time of the trip. This table's $B^{th}$ element of its $A^{th}$ column is increased in value with the highest learning rate, for example: 5%. Next we update the same element of neighborhood tables with decreasing learning rates such as 3%, 1% and 0.05%. Other elements in these columns are decreased in value to reflect the fact that although the starting location is the same these locations was not visited in the most recent trip data. Over time, each column of the matrix represents the long term average of the frequencies the driver goes from one location to another one. These tables serve as the system's evidence to provide destination predictions given a driver's current location and time.

Neighborhood is an observed time/day table are those with DOW and TOD tags that are considered "close to" the best match found. For example, if the best matching table has DOW=[Tuesday] and TOD=[07:00-08:00] the process may consider tables with DOW=[Tuesday] and TOD=[06:00-07:00] (one hour before) or TOD=[08:00-09:00] (one hour after) to be its neighborhood tables. Furthermore, if the learning process is at an early stage and few data are available in the tables, it may extend the neighborhood to the days prior/after the best match. For example: Monday and Wednesday would be the neighborhood days if our best match is a Tuesday. Repeating this process with the arrivals of new trip data, the driver's frequent trips between different locations are gradually captured in the tables.

At least one K×K matrix is stored with respect to each time/day pair, and correlations between typical time/day data for a given pair and its neighbors determine how high of a degree of learning is assigned to updates provided to neighboring elements. In one example, there could be a typical high degree of correlation (shown by the center TOD/DOW table) between events from 6:00-7:00 on Tuesday and the observed time (7:00-8:00 on Tuesday). Accordingly, the values assigned to the 6:00-7:00 elements K×K matrix (or matrices) are augmented almost as much as those assigned to the K×K matrix (or matrices) of the 7:00-8:00 element.

Conversely, there could be a low degree of correlation between 8:00-9:00 on Wednesday and a 7:00-8:00 Tuesday time. In some instances, such a correlation might even result as Wednesday 8:00-9:00 being ignored as a neighbor altogether, although if data points are low in supply it may be desirable to alter this value until more data is had. The low correlation results in a rather minor update being made to the value(s) of the K×K matrix of Wednesday 8:00-9:00 as compared to the value of Tuesday 7:00-8:00.

Of course, "neighbors" can be selected based on any suitable means. For example, instead of simply selecting time and day neighbors that bracket an observed time, the process may instead select some number of neighbors having the highest correlation to the observed time. Correlation can be determined based on travel vectors, vehicle usage in general, distances traveled, or any other suitable variables or combinations of variables. The number of selected correlations could be predetermined (e.g., select the eight closest correlating elements) or could be, for example, based on a threshold (e.g., select all elements having greater than 95% correlation).

Neighborhood zones closeness and relevance could also be represented by vectors centered at the best match in the DOW/TOD matrix. The vectors would have the highest value at the best match block and would decrease in value as the neighbors' proximity to the best match block decreases. This could be achieved, for example, with a fuzzy membership function, where each block has its own DOW and TOD fuzzy membership function centered at the mid-point of the block in its DOW and TOD space.

Figure 5:
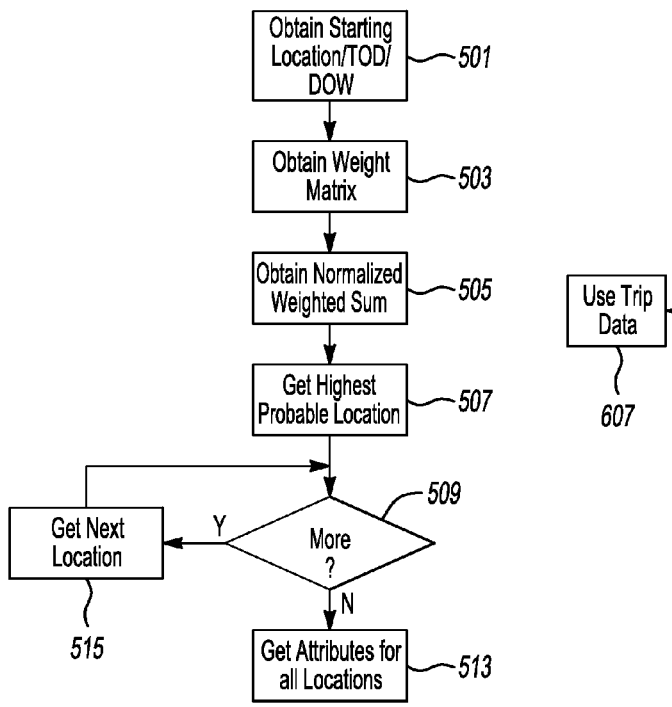
FIG. 5 shows an illustrative example of a destination prediction process.

Tables summarizing the driver's past trips are convenient sources/evidence to predict future trips. Given a current location and trip starting time, the system performs "informed guessing" on where the driver is most likely to go using the following procedure (one example of which is shown with respect to FIG. 5):

1. Determine the start location and starting time of the current trip 501

Locate a zone with DOW and TOD tags best matches the starting time. For example, the $I^{th}$ time zone of a TOD row in a DOW column best matches the starting time of the current trip. Use the element in $W_s$ as weight 503 and following 1 for all available DOW and TOD regions, $p^H$ ($DOW_{start}$, $TOD_{start}$) is the normalized weighted sum of the probability vectors 505.

Find the location in the database that best matches the current starting location. This can be done by comparing the GPS coordinates of the current location to locations already in the database. If the $N^{th}$ location in the database is within a certain distance (for example, without limitation. 0.3 miles) of the current location, we say the current starting location is the $N^{th}$ location.

2. Evaluate the $N^{th}$ column of the $I^{th}$ table represents the relative frequencies of the driver going from the $I^{th}$ location to all locations. Let's say the $M^{th}$ row in that column has the highest value, then the $M^{th}$ location would be the most likely destination 507. If more than one possible destination is desired 509, the 2nd, $3^{rd}$ . . . etc., likely destinations 515 can be found in similar way.

Similar to situations when the learning just started for the system and information is sparse or not available, the inclusion of tables from neighborhood time zones should be considered. This can be achieved with weighted average method such that the system can perform "informed guess" regarding the likely destinations.

Determination of how many additional destinations should be predicted can be done in a variety of manners. Some examples include, but are not limited to, selection of a predetermined number of additional destinations, having a highest probability of all known possible destinations; selection of all destinations above a threshold; or even asking a driver upon destination "guess", and then moving to a next destination having a next highest probability until the driver confirms that this is the correct destination. In at least one embodiment, a list of multiple guesses could be presented to the driver and the driver could be asked to select the actual destination (if present) from the list of presented destinations.

3. For any destination, or when a destination is known, trip attribute matrices may provide predicted stop location(s)'s related attributes can be obtained by taking the H'th column's Q(1)'th, Q(2)'th elements and so from available attribute matrices. This data can be useful in determining inputs to optimization algorithms, as, as shown with respect to FIG. 6, for predicting future possible destination points from a predicted destination.

Figure 6:
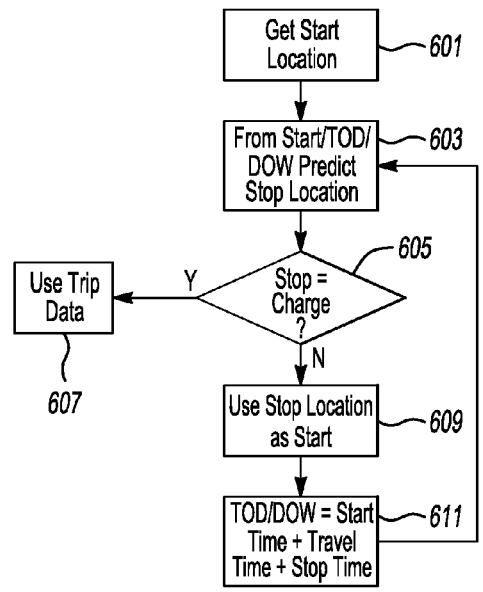
FIG. 6 shows an illustrative example of an iterative destination prediction process.

FIG. 6 shows an illustrative example of an iterative destination prediction process. In one example it is desirable to manage power output until a charging point is reached. Since a driver may stop at one or more locations along a route ending at a charging station, it may not be sufficient to simply manage power until a first destination is reached.

For example, if a driver consistently stopped at a fast food restaurant on the way home from work, a prediction algorithm may have that location as the most likely stop given a starting location as work and a time of day as 5:15 PM. Merely managing power until this stop is reached, however, may be unwise, unless the driver can charge the vehicle at the fast food restaurant, there may be insufficient power to power the car until the driver reaches home.

In an instance such as this, it may be desirable to predict a number of destination "hops," until a known charging point is reached.

To provide optimization and/or control applications with a distance until the vehicle reaches the next charging station, the system may provide multiple-steps-ahead prediction (trip-chain). The capability focus mainly on the distance to be travelled until the next charge station and can aid in, for example, scheduling battery discharge rate dynamically.

Multiple-steps-ahead predictions are achieved by iteratively obtaining the next start location and its related context information (DOW and TOD) to form a new input vector and repeat 1-step-ahead prediction procedure. The new input vector is formed with following procedure:

1. After a first vector has been obtained 601, including a first stop location 603, it is determined if the predicted destination is a charging location 605. If not, a predicted next start location is obtained.

2. Predicted next start location is the predicted stop location from the result of the previous prediction iteration based on stop location and start time 609. In other words, in the example above, the fast food restaurant would be both the predicted first stop location and next start location.

3. From predicted trip duration and stopping duration we can iteratively derive an estimated trip starting time (for the second leg) 611. The stating time for the second leg is essentially the starting time of the trip+the trip duration to the first stopping point+predicted stop time. All of this data may be saved as attribute data with respect to a particular travel vector between a start and end destination.

4. These steps 2 and 3 may be repeated until the predicted stop destination is a charging station 605, at which point the total trip data 607 may be determined and used for optimization algorithms.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-implemented trip-planning method comprising:
    accessing destination elements of a driver information matrix, via a trip-planning computer, based on a trip start-time and day-of-week, wherein each accessed element has a probability associated therewith, indicating a likelihood of the element being a trip-end destination, wherein, if no destination element corresponding to the trip start-time and day-of-week exists, at least one destination element, corresponding to other related start times and days of week, is accessed based on predefined correlations defining relationships between the trip start-time and day-of-week and the other related start-times and days-of-week;
    selecting, via the trip-planning computer, from the accessed elements, a destination having the highest associated probability of being the trip-end destination; and
    utilizing the selected destination as an end destination for trip planning.

2. The method of claim 1, wherein the accessing is further based at least in part on a starting location.

3. The method of claim 2, wherein the probability indicating the likelihood of the element being the destination at which a vehicle trip will end is further based at least in part on the starting location.

4. The method of claim 1, further comprising:
    presenting the selected destination to a driver for confirmation, wherein the utilizing does not occur until the driver has confirmed the selected destination.

5. The method of claim 1, wherein the correlation includes identification of the day-of-week as a weekday or weekend.

6. The method of claim 1, wherein the correlation includes elements immediately temporally preceding or following a time block containing the start-time for the same day-of-week.

7. A computer implemented vehicle operating method comprising:
    accessing one or more destination elements of a matrix of driver information, via a trip-planning computer, the accessing based at least in part on a trip start time and day of week, wherein each accessed element has a probability associated therewith, indicating a likelihood of the element being a destination at which a vehicle trip will end, wherein, if no destination element corresponding to the start-time and day-of-week exists, at least one destination element, corresponding to other related start times and days of week, is accessed based on predefined correlations defining relationships between the trip start-time and day-of-week and the other related start-times and days-of-week;
    selecting, via the trip-planning computer, from the one or more accessed elements, a destination having the highest probability of being the destination at which the vehicle trip will end; and
    utilizing the selected destination as an end destination for vehicle operation, including at least fuel optimization determinations to optimize fuel usage to the end destination.

8. The method of claim 7, wherein the accessing is further based at least in part on a starting location.

9. The method of claim 8, wherein the probability indicating the likelihood of the element being the destination at which a vehicle trip will end is further based at least in part on the starting location.

10. The method of claim 7, further comprising:
    presenting the selected destination to a driver for confirmation, wherein the utilizing does not occur until the driver has confirmed the selected destination.

11. The method of claim 7 wherein the correlation includes identification of the day-of-week as a weekday or weekend.

12. The method of claim 7, wherein the correlation includes elements immediately temporally preceding or following a time block containing the start-time for the same day-of-week.

13. A vehicle based computing system comprising:
    a processor, in communication with at least a memory;
    at least one vehicle network, with which the processor is operable to communicate;
    a transceiver, providing communication between the processor, a mobile, wireless device, and a remote network accessed through the mobile, wireless device;
    wherein the processor is operable to execute instructions stored in the memory to perform a method comprising:
    accessing one or more destination elements of a matrix of driver information, the accessing based at least in part on a trip start time and day of week, wherein each accessed element has a probability associated therewith, indicating a likelihood of the element being a destination at which a vehicle trip will end, wherein, if no destination element corresponding to the trip start time and day of week exists, at least one destination element, corresponding to other related start times and days of week, is accessed based on predefined correlations defining relationships between the trip start time and day of week and the other related start times and days of week;
    selecting, from the one or more accessed elements, a destination having the highest probability of being the destination at which the vehicle trip will end; and
    utilizing the selected destination as an end destination for trip planning.

14. The vehicle based computing system of claim 13, wherein the method further comprises:
    presenting the selected destination to a driver for confirmation, wherein the utilizing does not occur until the driver has confirmed the selected destination.

15. The vehicle based computing system of claim 13, wherein the correlation includes identification of the day-of-week as a weekday or weekend.

16. The vehicle based computing system of claim 13, wherein the correlation includes elements immediately temporally preceding or following a time block containing the start-time for the same day-of-week.

17. The vehicle based computing system of claim 13, wherein the processor is operable to deliver the end destination to one or more planning and/or navigation modules in communication with the vehicle network.

18. The vehicle based computing system of claim 13, wherein the matrix of driver information is stored on the remote network, and wherein the processor is operable to access the matrix through wireless communication with the wireless device in communication with the remote network.

* * * * *